United States Patent
Yost

(10) Patent No.: US 10,757,869 B1
(45) Date of Patent: Sep. 1, 2020

(54) APPARATUS AND METHOD FOR CONSTRAINED PLANT CULTIVATION

(71) Applicant: Darryn Yost, Newhall, CA (US)

(72) Inventor: Darryn Yost, Newhall, CA (US)

(*) Notice: Subject to any disclaimer, the term of this patent is extended or adjusted under 35 U.S.C. 154(b) by 315 days.

(21) Appl. No.: 15/650,814

(22) Filed: Jul. 14, 2017

(51) Int. Cl.
*A01G 9/26* (2006.01)
*A01G 7/04* (2006.01)

(52) U.S. Cl.
CPC ............... *A01G 9/26* (2013.01); *A01G 7/04* (2013.01)

(58) Field of Classification Search
CPC ... A01G 9/26; A01G 9/12; A01G 7/04; A01G 31/04
See application file for complete search history.

(56) References Cited

U.S. PATENT DOCUMENTS

| | | | | |
|---|---|---|---|---|
| 863,620 A * | 8/1907 | Martens | ............ | A01G 9/12 47/45 |
| 941,894 A * | 11/1909 | Stetson | ............ | A01G 9/12 47/45 |
| 1,619,791 A * | 3/1927 | Fritch | ............ | A01G 9/12 47/44 |
| 1,874,207 A * | 8/1932 | Purplaw | ............ | A01G 9/26 47/1.3 |
| 4,250,666 A * | 2/1981 | Rakestraw | ............ | A01G 7/045 211/131.1 |
| 4,969,290 A * | 11/1990 | Skoretz | ............ | A01G 9/04 108/20 |
| 6,446,385 B1 * | 9/2002 | Crutcher | ............ | A01G 9/18 47/17 |
| 10,295,165 B2 * | 5/2019 | Milam | ............ | F21V 29/503 |
| 2008/0271373 A1 * | 11/2008 | Fukuyama | ............ | A01G 9/12 47/66.7 |
| 2013/0326950 A1 * | 12/2013 | Nilles | ............ | A01G 31/06 47/62 R |
| 2014/0305040 A1 * | 10/2014 | Hall | ............ | A01G 9/12 47/65.5 |
| 2016/0235014 A1 * | 8/2016 | Donham | ............ | A01G 7/045 |
| 2016/0278303 A1 * | 9/2016 | Calsbeek | ............ | A01G 9/12 |
| 2017/0013794 A1 * | 1/2017 | Tinsley | ............ | A01G 31/06 |
| 2017/0188524 A1 * | 7/2017 | di Muro | ............ | A01G 9/128 |

(Continued)

FOREIGN PATENT DOCUMENTS

| | | | | |
|---|---|---|---|---|
| DE | 10350369 B3 * | 5/2005 | ............ | A01G 9/12 |
| EP | 3117707 A1 * | 1/2017 | ............ | A01G 17/005 |
| WO | WO-2006130028 A1 * | 12/2006 | ............ | A01G 9/12 |

*Primary Examiner* — Magdalena Topolski
*Assistant Examiner* — Morgan T Barlow
(74) *Attorney, Agent, or Firm* — Lawrence S. Cohen

(57) ABSTRACT

A method and system for cultivating angiosperms in a limited space in natural or artificial light by a dynamic growth constraint apparatus that limits vertical growth during the vegetation phase but allows vertical growth during the flowering phase, such that the flower or fruit may be optimally harvested. In various embodiments, the apparatus includes a mesh to constrain vertical growth of the cultivated plant and a mechanism for raising, lowering and rotating the plant or constraining mesh with respect to the other. In various embodiments, the mesh is moved with respect to the plant during the vegetation phase of the plant and immobile during the flowering phase of the plant. Plant phase and thus the mesh/plant motion may be controlled by artificial light timing, the detection of natural light, or by digitized image analysis of the plant during its growth phases.

13 Claims, 6 Drawing Sheets

(56) References Cited

U.S. PATENT DOCUMENTS

| | | | | |
|---|---|---|---|---|
| 2017/0188525 A1* | 7/2017 | Paige, Sr. | .......... | A01G 13/0243 |
| 2017/0359969 A1* | 12/2017 | Slevkoff | ................ | A01G 17/06 |
| 2018/0084738 A1* | 3/2018 | Kuo | ....................... | A01G 22/00 |

* cited by examiner

APPARATUS AND METHOD FOR CONSTRAINED PLANT CULTIVATION

FIELD OF THE INVENTION

This invention relates to the field of horticulture or plant cultivation.

BACKGROUND

It has long been a goal to optimize plant growth in limited space. Various means and methods have been used with varying degrees of effectiveness.

A flowering angiosperm life cycle has several phases, including the seedling germination and sprouting phase, the vegetation phase, and the reproduction or fruiting phase. The cultivation of various parts of the plant leads to differing methods for optimizing growth, depending on what part of the plant is being harvested, such as the leaves, the flower, the fruit or the seeds,

SUMMARY

Disclosed are a method and system for cultivating angiosperms in a limited space by a dynamic growth constraint apparatus that limits vertical growth during the vegetation phase but allows vertical growth during the flowering phase, such that the flower or fruit may be optimally exposed to light without being self-shadowed by earlier plant vegetation and may be more conveniently harvested. In various embodiments, the apparatus includes a mesh to constrain vertical growth of the cultivated plant and a mechanism for raising, lowering and rotating the plant or the constraining mesh with respect to the other. In various embodiments, the mesh is moved with respect to the plant during the vegetation phase of the plant and is immobile during the flowering phase of the plant. Thus the mesh/plant motion may be controlled by artificial light timing, the detection of natural light or by analog based or digitized image analysis of the plant during its growth phases.

DETAILED DESCRIPTION

Figure 1:
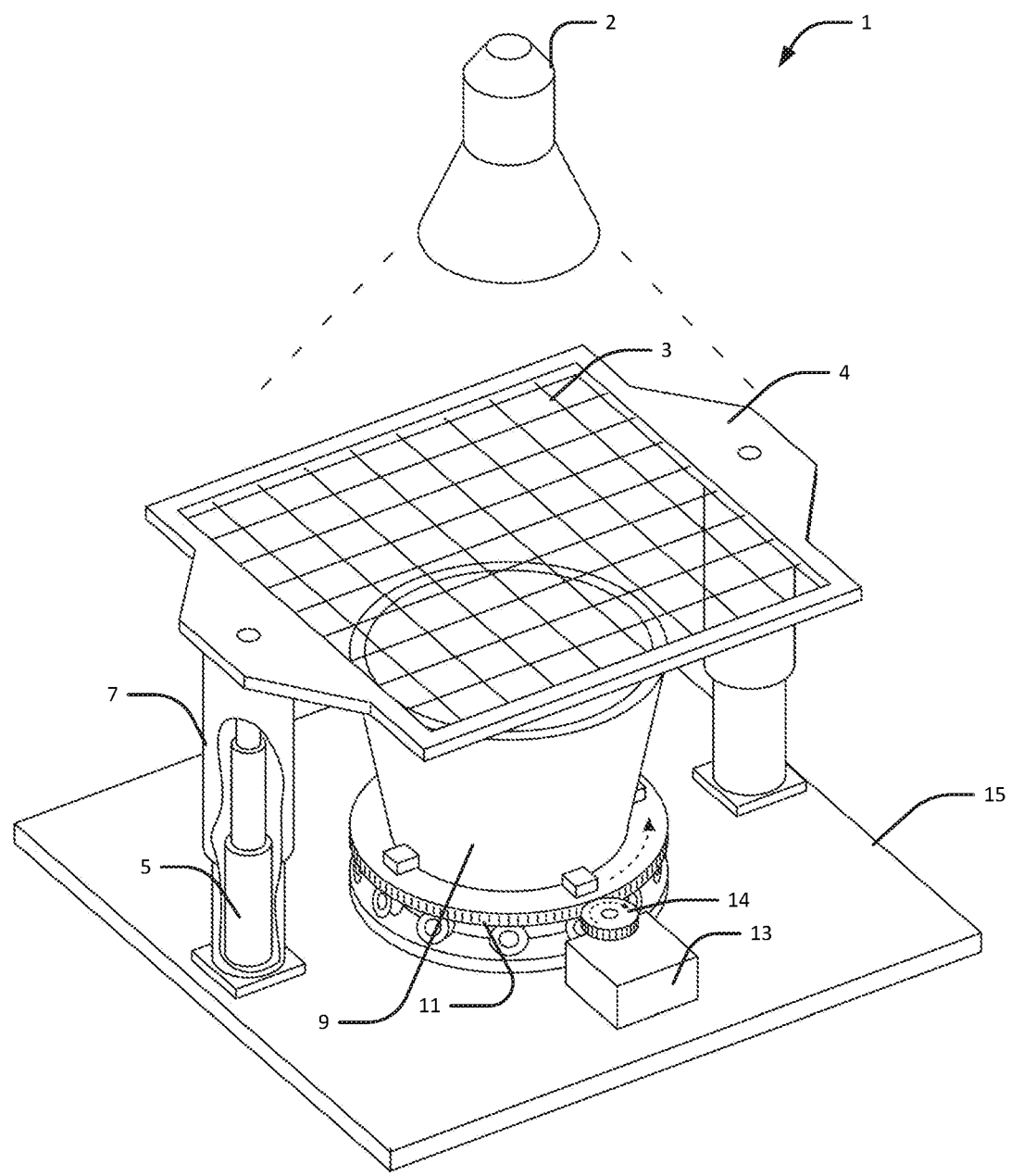
FIG. 1 shows an embodiment with the basic components of the system shown including the constraining mesh, plant container, base and motion mechanisms.

Certain varieties of angiosperm, including quinoa and amaranth, are harvested for vertical flowering portions of their anatomy. Quinoa is known to be a "superfood" which is a complete protein and high in iron, fiber and potassium. It is an ideal food for cultivating in conditions with limited options. Various embodiments disclosed provide advantages for cultivating plants such as quinoa with harvested vertical flowering, but also herbs which may be harvested for their leafy vegetation, such as basil or the mint family. As will be apparent, the invention can be implemented with numerous vegetation species.

After germination and the seedling stage, angiosperms begin a period of vegetation to develop substantial surfaces of the plant (leaves) for energy production by photosynthesis. In various embodiments, plant vegetation is constrained, or trained to a maximum height and the vegetation is spread across an area much larger than during unconstrained growth. In various embodiments, this is accomplished by periodically moving a screen or mesh in a manner which drags any vegetation which is growing through the mesh underneath the mesh, constraining the growth height. The mesh is defined to be a structure which is transparent or nearly transparent to light, allows vertical growth of plant sprouts or flowers and may restrict vegetation growth by movement of the plant or the structure. In various embodiments, the movement of the mesh may be linear, vertical or rotational with respect to the plant and plant's growth medium (soil or hydroponic). By periodically dragging the vegetation back under the constraining mesh a "canopy" of vegetation is created which optimizes the energy production area while minimizing growth height. In various embodiments, the cultivation environment, which may utilize artificial lighting may make effective use of this advantage such that multiple growing environments may be layered vertically in a confined space.

For embodiments which are directed to cultivating and harvesting plant leafy vegetation, the automatic periodic mesh/plant movement may continue until harvesting, at which point the mesh is removed.

For the embodiments which are utilized for cultivating and harvesting the flowering or fruiting portion of the plant, reproduction triggers are either identified or incorporated into the apparatus operation such that the vertical constraint is stopped during flowering and fruiting phases of the plant. For example, in various embodiments, after a period of vegetation growth, the timing of artificial lighting is used to trigger the plant's reproduction phase. In this example, the constraint movement of the apparatus is stopped when at the same time the apparatus lighting timing is altered to trigger reproduction. Lighting triggers for flowering are species dependent, but in certain species a schedule of 12 hours of illumination and 12 hours of darkness triggers the reproductive phase. This coincides with vernal or autumnal equinox in the northern hemisphere.

For the specific angiosperm mentioned above, namely quinoa, details of an exemplary embodiment are provided here. In natural environments, quinoa is typically planted in early spring, and is known for its slow growth during various growth periods. Germination happens in less than a week, with true leaves forming at about 3-4 weeks. Vegetative growth occurs for the 4-6 weeks with the reproductive period beginning in late summer. For quinoa, this is called florescence. Over the next 4-6 weeks, the plant reaches maturity and goes to seed by late fall. In various embodiments, when the disclosed system is utilized in a natural environment, manual operation of the system is initiated when the vegetation reaches a chosen level at which the vegetation stems are sufficiently developed to support horizontally trained growth. For various species, this may be from 15-24 inches. After the vegetation constraint mode is initiated, the system begins periodic motion, either laterally or laterally and vertically. In exemplary applications, this motion occurs at selectable times and lateral/vertical distances. Modeled systems indicate that motion may be initiated for as infrequently as once per week or as frequently as once per day, depending on how quickly growth occurs in a particular environment. Empirical studies have determined that for various species, an optimal vegetation coverage is 2/3 of the area of the constraining mesh. For various species, the reproduction phase may be triggered or manipulated by environmental conditions such as ambient temperature, air flow, water, or hours of lighting, among others. For various species, natural light that occurs near the summer solstice with long exposure time may trigger the reproduction phase. In various embodiments, the constraint motion of the system may be stopped manually when the onset of the reproduction phase is noted, or may be triggered by the sensors Which detect the hours of daily illumination. For natural tight settings, growth continues until the natural maturation of the plant, in the fall, when the seeds begin to dry.

Other species of angiosperms have been tested under artificial environment settings, including hydroponic or soiled based growth medium, artificially controlled nutrient delivery, and artificial lighting. For these plant species for which the early flower portion is harvested, the following exemplary specifications have been shown to be effective. 1) Plant growth is constrained to 8"-18" above the growth medium. 2) Mesh openings are 1"x1" to 2"x3". 3) The training or constraining motion of the mesh occurs once every 3-7 days and rotates the mesh 45-90 degrees and raises and lowers the mesh by 1-3" during the rotation. 4) After 2-4 weeks of vegetation growth and training, the vegetation covers approximately 2/3 of the mesh area and reproductive growth is triggered by changing the artificial lighting to a 12 hour on/12 hour off schedule. 5) Training/constraining is stopped within 1-3 days of modifying the lighting schedule 6) Plant may be harvested of the flowering or pre-flowering portions after another 6-12 weeks of growth.

In FIG. 1 a basic embodiment is depicted 1, which includes the plant container 9, a light 2, the constraining mesh 3, a support mechanism 7 for raising and lowering the mesh 3, a telescoping or screw driven portion 5 of the mesh support, a turntable 11 for rotating the container 9 and a motor 13 for driving the turntable, and a base 15 for the apparatus. this embodiment and as will be shown in the diagrammatic drawings, the apparatus operates to spread vegetation growth into a "canopy" during the vegetation phase, and to allow the vertical growth of a flower for harvesting during the reproductive phase.

Figure 2:
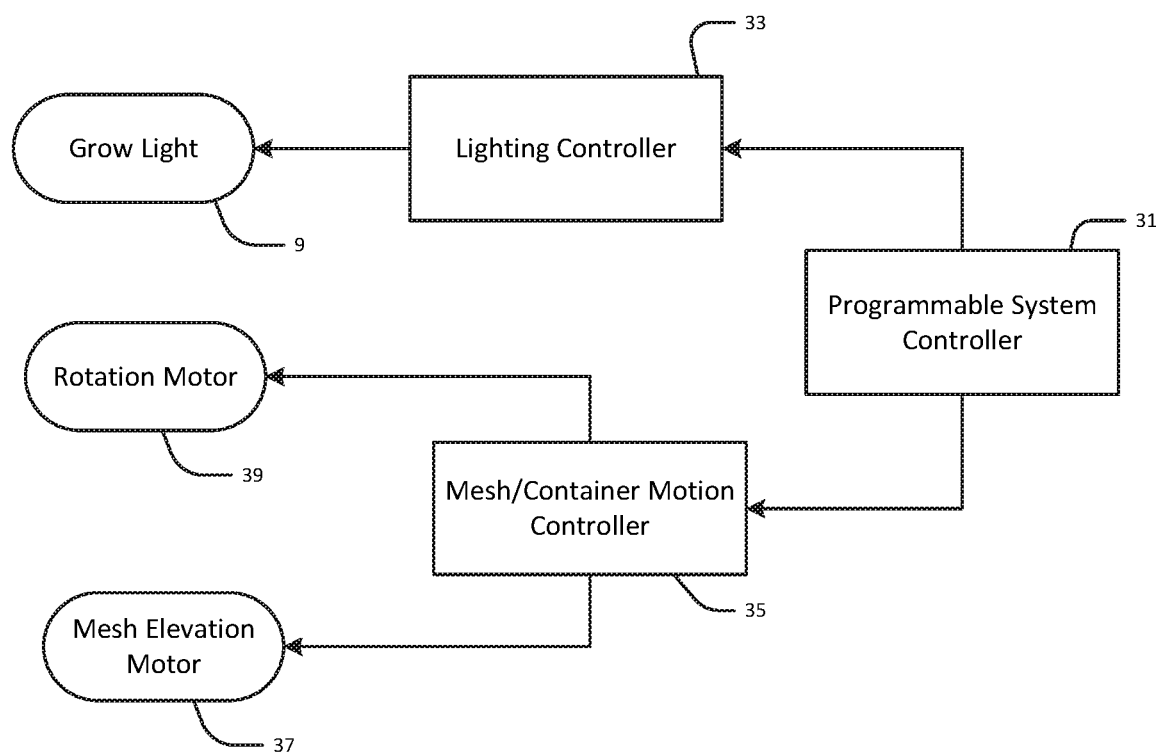
FIG. 2 shows a component diagram of an exemplary embodiment.

FIG. 2 shows the basic components of certain embodiments of the system, which include a programmable system controller 31, a lighting controller module 33, a light 9, a motion controlling module 35, a rotational turntable motor 39 and powered mesh elevation or height motor 37. In various embodiments, the lighting and mesh height and container rotation operate to cultivate a restricted plant height or "canopy" and operate to allow for vertical growth of the flowering portion during the reproductive phase.

Figure 3A:
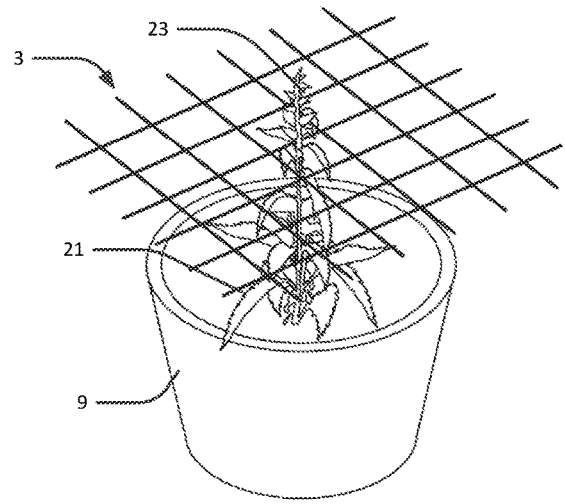
FIGS. 3A-D show perspective views of how the respective motion of the constraining mesh and plant container operate during phases of plant growth.
Figure 3B:
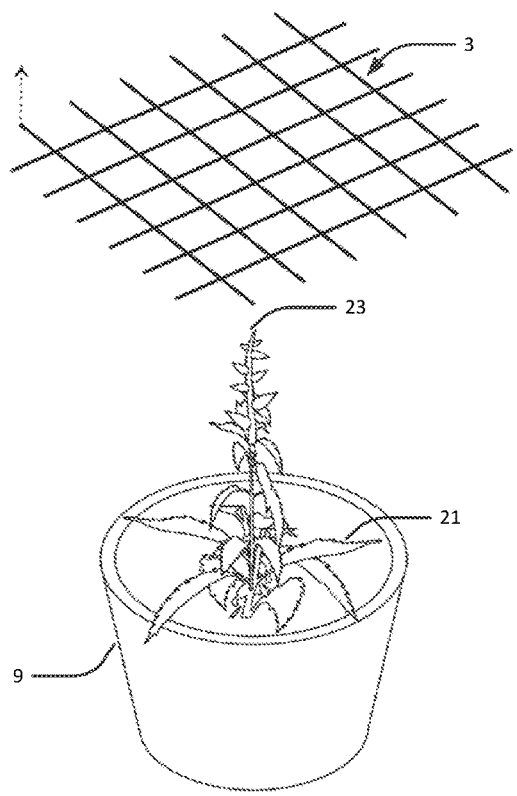
Figure 3C:
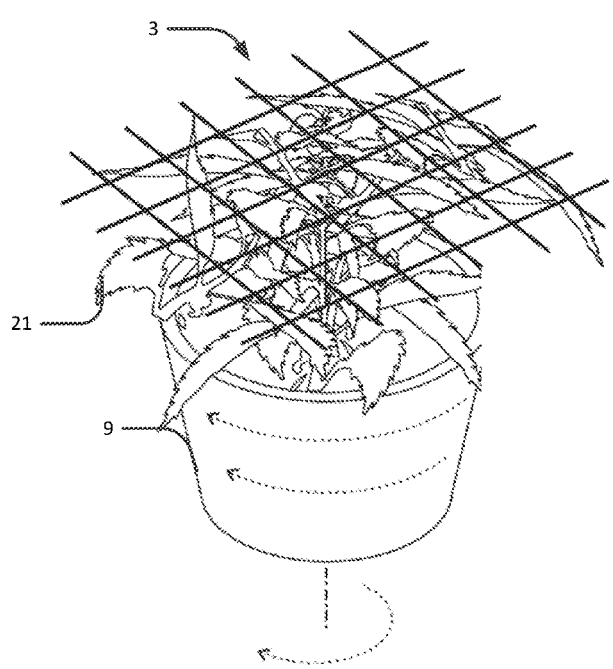
Figure 3D:
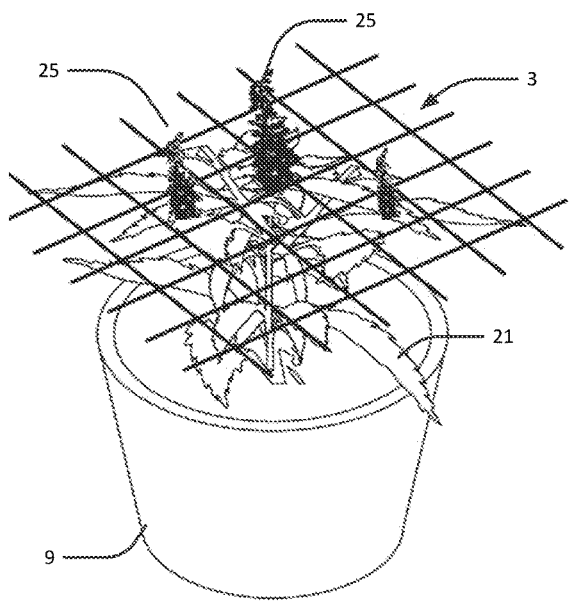

FIG. 3A-D shows simplified perspective views of the apparatus and plants during different phases of operation of the apparatus and growth of the plants. In these drawings the apparatus for controlling motion of the mesh/container have been omitted. FIG. 3A shows a simplified view of the container 9, plant 21 and mesh 3. As shown, during this phase of growth, the sprout or tip 23 of the plant's vegetation is protruding through the mesh 3. In various embodiments, the mesh 3 is periodically raised off the plant 21 by the apparatus mechanism, as is shown in FIG. 3B. In other embodiments the mesh is not raised completely free of the plant. In various embodiments, as the mesh 3 is lowered back onto the plant vegetation as it is rotated, matting and pulling down the plant vegetation 21 to spread it and create the aforementioned "canopy" effect as shown in FIG. 3C. In various embodiments, the time period between mesh motion operations is programmed according to the species being cultivated for vegetation growth. Likewise, the rotational speed, lift height, and the entire vegetation growth period may be programmed according to the cultivated species and empirical data. In other embodiments, the vegetation period may be indicated manually or may be determined by digital image processing, for example if a digital image is determined to have sufficient amount of green in the image area. For those plants which are cultivated for their flowering or fruiting portions when the end of the primary vegetation growth is determined, the mesh motion is stopped, to allow the vertical bloom of the flower bud, flower, or fruit 25 to protrude vertically through the mesh and be harvested as shown in FIG. 3D.

Figure 4A:
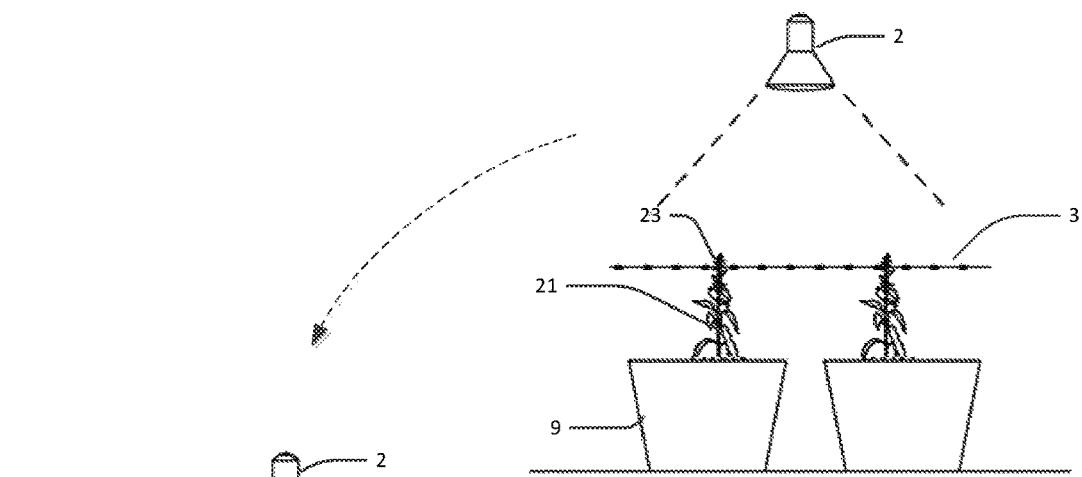
FIGS. 4A-D show side views of how the respective motion of the constraining mesh and multiple plant containers operate during phases of plant growth.
Figure 4B:
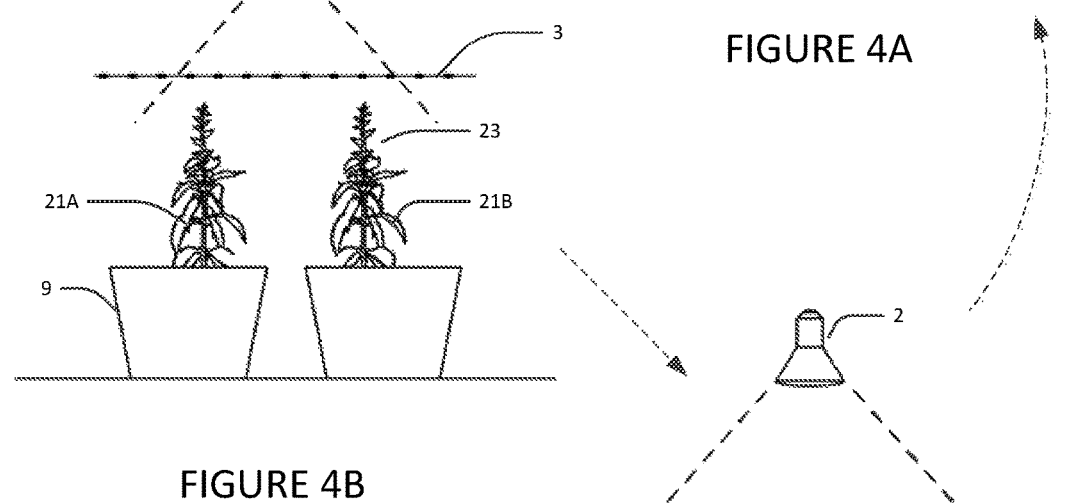
Figure 4C:
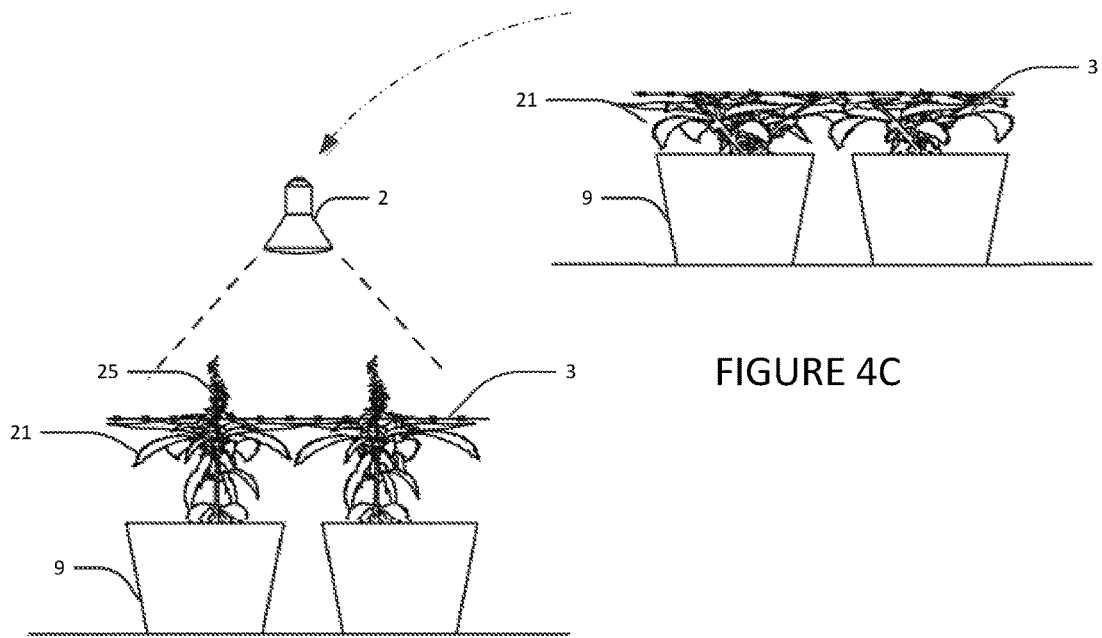
Figure 4D:

FIG. 4A-D shows simplified side views of the apparatus and plants during different phases of operation of the apparatus and growth of the plants. In this embodiment, multiple plant containers are depicted. In these drawings the apparatus for controlling motion of the mesh/containers has been omitted. FIG. 4A shows a simplified view of the containers 9, plant 21, mesh 3, and light 2 from the side. As shown, during this phase of growth, the tip of a plant's vegetation or sprout 23 grows through the mesh 3. In this embodiment, multiple plants are shown 21A 21B in separate containers. In various embodiments, multiple plants may be grown in a single container. In various embodiments, the mesh 3 is periodically raised off the plant by the apparatus mechanism, as is shown in FIG. 4B. In various embodiments, as the mesh is lowered back onto the plant vegetation it is rotated, matting down the plant vegetation 21 to spread it and create the "canopy" effect as shown in FIG. 4C, In various embodiments, the vegetation daily time period and growth phase time periods are programmed according to the species being cultivated for vegetation growth. In other embodiments, the vegetation period may be indicated manually or may be determined by digital image processing, for example if a digital image is determined to have a sufficient amount of green in the image area. For those plants which are cultivated for their flowering or fruiting portions 25, when the end of the primary vegetation growth is determined, the mesh 3 motion is stopped, to allow the vertical bloom 25 of the flower bud, flower, or fruit to protrude vertically through the mesh and be harvested as shown in FIG. 4D. As shown, the stages 4A-4B-4C are repeated during the vegetation phase. Once the decision is made to trigger flowering, the cycle moves to stage 4D and the motion of the constraining mesh stops. As determined according to the specific species of plant cultivated, flowering portions 25 may sprout from a single location or from multiple locations on a single plant as shown in 4D.

Figure 5:
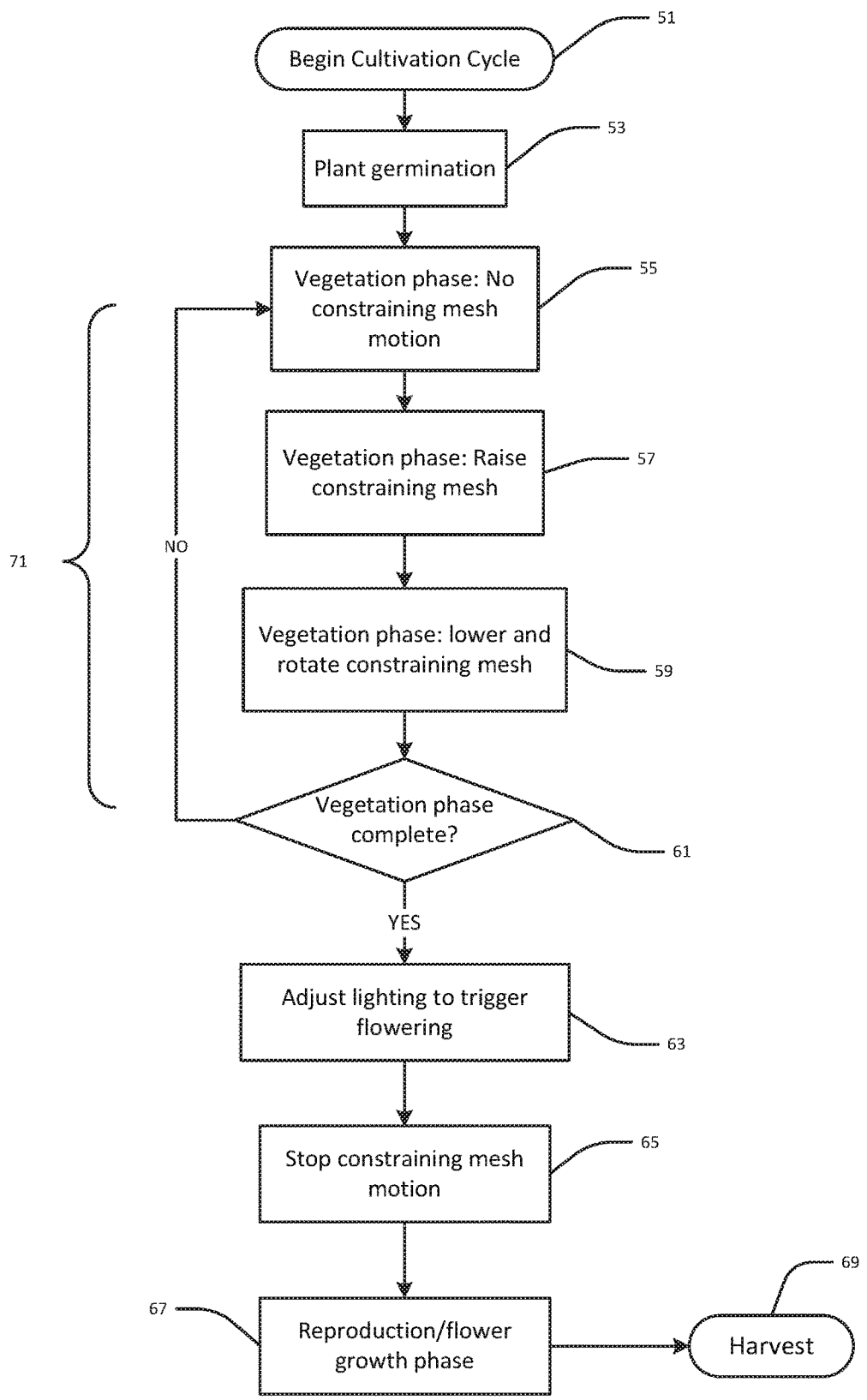
FIG. 5 shows a flow chart of an exemplary embodiment of the cultivation method.

FIG. 5 shows a flow chart depicting operation of the system and apparatus. The system begins operation by initiating all components 51. After the plant seeds germinate 53 and the seedlings reach and begin to reach the constraining mesh, the vegetation growth phase 71 begins. First, the constraining mesh remains motionless 55. After a programmed period of growth which may be determined empirically, vegetation growth begins to protrude through the constraining mesh. The mesh may then be raised, sometimes above the vegetation 57 to release it from older growth and then lowered and rotated back down onto the vegetation 59, dragging the vegetation back under the mesh. After a longer term period for vegetation growth, which may be determined empirically or detected by automatic means such as machine vision, the vegetation growth is considered complete 61. Until vegetation growth is completed, the short term growth cycle 71 is repeated to develop the vegetation canopy. Once vegetation is considered complete 63, lighting daylight cycles are altered to mimic the natural lighting cycle that triggers the flowering or reproduction phase 63. At this point motion of the constraining mesh is stopped 65 so that the flowering portion of the plant may be allowed to grow vertically unhindered by the movement of the mesh 67. When the flower, fruit, grain or seeds reach the desired maturity, they may be harvested 69.

Figure 6:
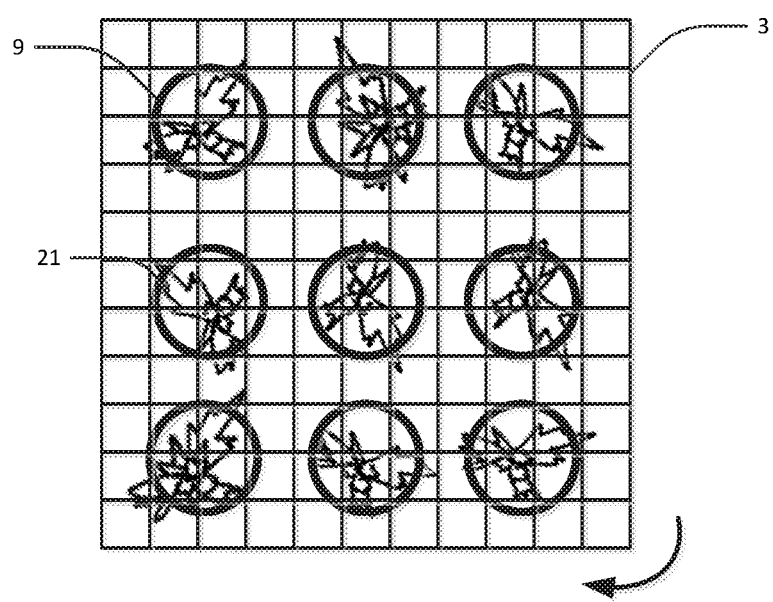
FIG. 6 shows a top view of an embodiment with multiple individual plant containers under a single mesh.

FIG. 6 shows a top view of top view of an embodiment utilizing multiple plants 21 and multiple containers 9, in this example configuration, 9 plants 21 and 9 containers 9 are shown under a single mesh 3. Various apparatus for moving plants with respect to the constraining mesh may be implemented as described above and below. Such apparatus may be configured for moving the mesh in rotation as well as lifting and lowering it in relation to the plants. Such apparatus may further be configured to cause the same relative movements by moving the plants. In addition, relative movements may be split between the moving the mesh and the plants. For example, rotation may be executed by rotating the mesh while lifting and lowering could be executed by lifting and lowering the plants, and this split movement may be reversed.

In alternative embodiments, the constraining mesh is rotated instead of the container. In other embodiments, the constraining mesh is rotated and raised and lowered by a single central post, which may utilize an angular or pitched thread to perform both rotation and height changes simultaneously. In other embodiments, multiple plant containers may be used underneath the constraining mesh. In various embodiments, flowers, vegetables, leaves, herbs, grain, seeds or fruit may be the objective plant component to be harvested. In another embodiment, an annular cam track is used to raise and lower the constraining mesh or turntable according to the cam track geometry in another embodiment, support structures are located under the mesh to support the plant stalks or vines from below as the plant vegetation is spread underneath or in proximity to the constraining mesh, In an alternative embodiment, the mesh or turntable is moved manually, such as by hand crank. In various embodiments, the mesh opening may be rectangular, square, circular or other geometric shape and between 1/8" and 5" across.

The routines and/or instructions that may be executed by the one or more processing units to implement embodiments of the invention, whether implemented as part of an operating system or a specific application, component, program, object, module, or sequence of operations executed by each processing unit, will be referred to herein as "program modules", "computer program code" or simply "modules" or "program code." Generally, program modules may include routines, programs, objects, components, logic, data structures, and so on that perform particular tasks or implement particular abstract data types. Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. Given the many ways in which computer code may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The flowcharts, block diagrams, and sequence diagrams herein illustrate the architecture, functionality, and operation of possible implementations of systems, methods, and computer program products according to various embodiments of the present invention. In this regard, each block in a flowchart, block diagram, or sequence diagram may represent a segment or portion of program code, which comprises one or more executable instructions for implementing the specified logical function(s) and/or act(s), Program code may he loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the blocks of the flowcharts, sequence diagrams, and/or block diagrams herein. In certain alternative implementations, the functions noted in the blocks may occur in a different order than shown and described. For example, a pair of blocks described and shown as consecutively executed may be instead executed concurrently, or the two blocks may sometimes be executed in the reverse order, depending upon the functionality involved. Each block and combinations of blocks can be implemented by special purpose hardware-based systems that perform the specified functions or acts, or combinations of special purpose hardware and computer instructions.

The program code embodied in any of the applications described herein is capable of being individually or collectively distributed as a program product in a variety of different forms. In particular, the program code may be distributed using a computer readable media, which may include computer readable storage media and communication media. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Communication media may embody computer readable instructions, data structures or other program modules. By way of example, and not limitation, communication media may include wired media such as a wired network or direct-wired connection, and wireless media such as acoustic, RF, infrared and other wireless media. Combinations of any of the above may also be included within the scope of computer readable media.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising."

While the invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. For example, the embodiments of the invention may be used in conjunction with other cultivation related applications. The invention in its broader aspects is therefore not limited to the specific details, representative methods, and illustrative examples shown and described. Accordingly, departures may be made from such details without departing from the spirit or scope of applicants' general inventive concept.

The invention claimed is:

1. A method for controlling growth of a plant in a growth medium by constrained cultivation of the plant to limit vertical growth during a vegetation phase of growth and by allowing vertical growth during a reproduction phase comprising:
   providing a light source positioned relative to the plant to provide growth;
   providing a constraining mesh in position above the growth medium;
   implementing relative movement between the mesh and the plant in the following movement modes:
      a dynamic growth constraining mode during a vegetation phase of growth of the plant in which the mesh is in contact with the vegetation of the plant to constrain growth, thereby matting down the plant vegetation and allowing horizontal vegetation growth and controlling vertical growth and periodically, and as the plant vegetation grows vertically protruding through the mesh, providing constraint relative movement by moving one or more of the mesh and the plant relative to the other, to restore constraint on the vegetation; and
      a free growth mode during a reproduction phase of the plant in which the constraint relative movement is stopped and the reproduction portion of the plant is allowed to grow free of any inhibitions from the vegetation that has been constrained;
   providing a periodically operated mechanism to perform the movement modes.

2. The method of claim 1 wherein the movement modes are done by the group consisting of:
   the mesh moving vertically relative to the plant,
   the mesh moving both vertically and rotationally relative to the plant,
   the mesh moving rotationally relative to the plant,
   the plant moving rotationally relative to the mesh,
   the plant moving rotationally relative to the mesh,
   the plant or the mesh moving vertically and the plant moving rotationally, and
   both the plant and the mesh moving rotationally.

3. The method of claim 1 further comprising:
   providing the periodically operated mechanism and a programmable controller for providing a timing operation that operates the light and the constraint relative movement according to selected reproduction phase triggering timing and stopping the constraint relative movement during the reproduction phase.

4. The method of claim 1 wherein the constraint relative movement is rotational and wherein the periodically operated mechanism comprises a rotational motor.

5. The method as in claim 4 wherein the rotational movement comprises providing a rotating turntable underneath a container for the plant, wherein the turntable is driven by the rotation motor.

6. The method as in claim 1 wherein the constraint relative movement is linear along the direction of growth of the plant.

7. The method as in claim 1 wherein the constraint relative movement comprises
   raising the mesh relative to the plant, wherein the mesh is raised relative to the plant by a periodically operated lift apparatus; and
   lowering the mesh relative to the plant, wherein the mesh is lowered relative to the plant by the lift apparatus.

8. The method as in claim 7 wherein the periodically operated lift apparatus operates by rotating a rod with an angled thread.

9. The method as in claim 1 wherein the light is artificial and is positioned above the mesh thereby to provide lighting on the plant from above; and providing control of the lighting as selected for the vegetation phase of plant growth; and providing control of the lighting as selected for the reproductive phase of plant growth.

10. The method as in claim 9 wherein the constraint relative movement is stopped approximately timed when a reproductive phase of the plant begins, further wherein the beginning of the reproductive phase of the plant is triggered by timing of the artificial light.

11. The method as in claim 1 wherein motion of the mesh relative to the plant is stopped approximately timed to when a reproductive phase of the plant begins.

12. The method as in claim 1 wherein the light is artificial and wherein the light and the periodically operated mechanism are controlled by a programmable controller which is programmable to provide timing cycles for the light and the constraint relative movement wherein the timing cycles are selected for a vegetation phase and for a reproduction phase of the plant growth.

13. The method as in claim 1 wherein the mesh openings are between 3.175 mm and 127 mm (between 1/8 and 5 inches) across.

* * * * *